United States Patent
Kadle et al.

(10) Patent No.: US 7,063,137 B2
(45) Date of Patent: Jun. 20, 2006

(54) HEAT PUMP WITH SECONDARY LOOP AIR-CONDITIONING SYSTEM

(75) Inventors: Prasad Shripad Kadle, East Amherst, NY (US); Mahmoud Ghodbane, Lockport, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/754,037

(22) Filed: Jan. 8, 2004

(65) Prior Publication Data

US 2005/0022983 A1    Feb. 3, 2005

Related U.S. Application Data

(60) Provisional application No. 60/487,460, filed on Jul. 15, 2003.

(51) Int. Cl.
  *F25B 29/00*    (2006.01)
  *B60H 1/32*    (2006.01)
  *B60H 1/00*    (2006.01)

(52) U.S. Cl. .......................... 165/202; 165/42; 165/43; 237/2 B; 237/12.3 B; 62/238.6; 62/196.4; 62/503; 62/434; 62/435; 62/244

(58) Field of Classification Search ................ 165/202, 165/42, 43, 10; 237/2 B, 12.3 B; 62/238.6, 62/196.4, 503, 434, 435, 244
See application file for complete search history.

(56) References Cited

U.S. PATENT DOCUMENTS 2,801,827 A    8/1957    Dolza ............................. 257/7
4,616,484 A    10/1986    Mehdi et al. .................. 62/180
5,291,941 A *  3/1994    Enomoto et al. .............. 165/62
5,491,983 A *  2/1996    Hamilton et al. ............. 62/503
6,230,508 B1*  5/2001    Baker et al. ................... 62/244
6,405,793 B1   6/2002    Ghodbane et al. .......... 165/203
6,422,308 B1*  7/2002    Okawara et al. ............ 165/202
2001/0020529 A1*  9/2001  Karl ........................... 165/202

FOREIGN PATENT DOCUMENTS

| EP | 1 112 873 A2 | 7/2001 |
| EP | 1 112 873 A3 | 7/2001 |
| EP | 1 295 739 A1 | 3/2003 |
| JP | 06143974 A * | 5/1994 |
| JP | 11301254 A * | 11/1999 |

* cited by examiner

*Primary Examiner*—John K. Ford
(74) *Attorney, Agent, or Firm*—Patrick M. Griffin

(57) ABSTRACT

A chiller-condenser is disposed downstream of a condenser and a chiller-evaporator is disposed downstream of the chiller-condenser. A main three-way valve is disposed between the compressor and the condenser for directing flow from the compressor to the condenser in the air-conditioning mode and for directing flow from the compressor through a by-pass line to the chiller-condenser in the heat pump mode. A heat pump (HP) expansion device shown as an orifice tube expands the refrigerant in the heat pump mode and an by-pass valve is disposed between the chiller-condenser and the chiller-evaporator for directing flow from the chiller-condenser through the heat pump expansion device and to the chiller-evaporator in the heat pump mode. An air-conditioning (A/C) expansion device shown as orifice tube is disposed downstream of the condenser and upstream of the by-pass line for expanding the refrigerant in the air-conditioning mode.

5 Claims, 2 Drawing Sheets

HEAT PUMP WITH SECONDARY LOOP AIR-CONDITIONING SYSTEM

RELATED APPLICATION

This application claims all of the benefits of provisional application 60/487,460 filed Jul. 15, 2003.

FIELD OF THE INVENTION

The subject invention relates to a heating and air-conditioning system for an automotive vehicle.

BACKGROUND OF THE INVENTION

In the normal system, in the heat pump mode, the refrigerant flow would be reversed so as to make the condenser, in effect, the evaporator and the evaporator the condenser. Thus, the heat that the evaporator gains from the ambient air will then be pumped into the condenser, which would be in the passenger compartment and thus provide heat. In the secondary loop system, the condenser is the chiller and the front-end heat exchanger is the evaporator (the passenger compartment heat exchanger will be called the cabin heat exchanger). The problem with both these systems is that the front-end heat exchanger cools down the ambient air, which may already be very low in temperature (below 40° F.). This causes this heat exchanger to freeze. This results in inadequate performance and potentially no performance after a while. A way around this is to utilize the heat from the coolant to evaporate the refrigerant in the evaporator. In such a system the front-end heat exchanger is bypassed and is replaced by a refrigerant-to-glycol (RTG) heat exchanger. This allows the coolant, which is warming up to be the source of heat for the evaporation process in the RTG. This, of course, slows down the coolant warm-up rate but is insignificant and results in dumping heat into the passenger compartment with a significantly higher rate because of the compression process.

SUMMARY OF THE INVENTION AND ADVANTAGES

The subject invention utilizes the secondary loop concept in conjunction with a heat pump.

A heater and air-conditioning assembly for a vehicle comprising a compressor for compressing a refrigerant and a front-end condenser for condensing fluid from the compressor. A chiller-condenser is disposed downstream of the condenser and a chiller-evaporator is disposed downstream of the chiller-condenser. A main three-way valve is disposed between the compressor and the condenser for directing flow from the compressor to the condenser in an air-conditioning mode and for directing flow from the compressor through a by-pass line to the chiller-condenser in a heat pump mode. A heat pump expansion device exchanges heat with the refrigerant in the heat pump mode and a by-pass valve is disposed between the chiller-condenser and the chiller-evaporator for directing flow from the chiller-condenser through the heat pump expansion device and to the chiller-evaporator in the heat pump mode.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
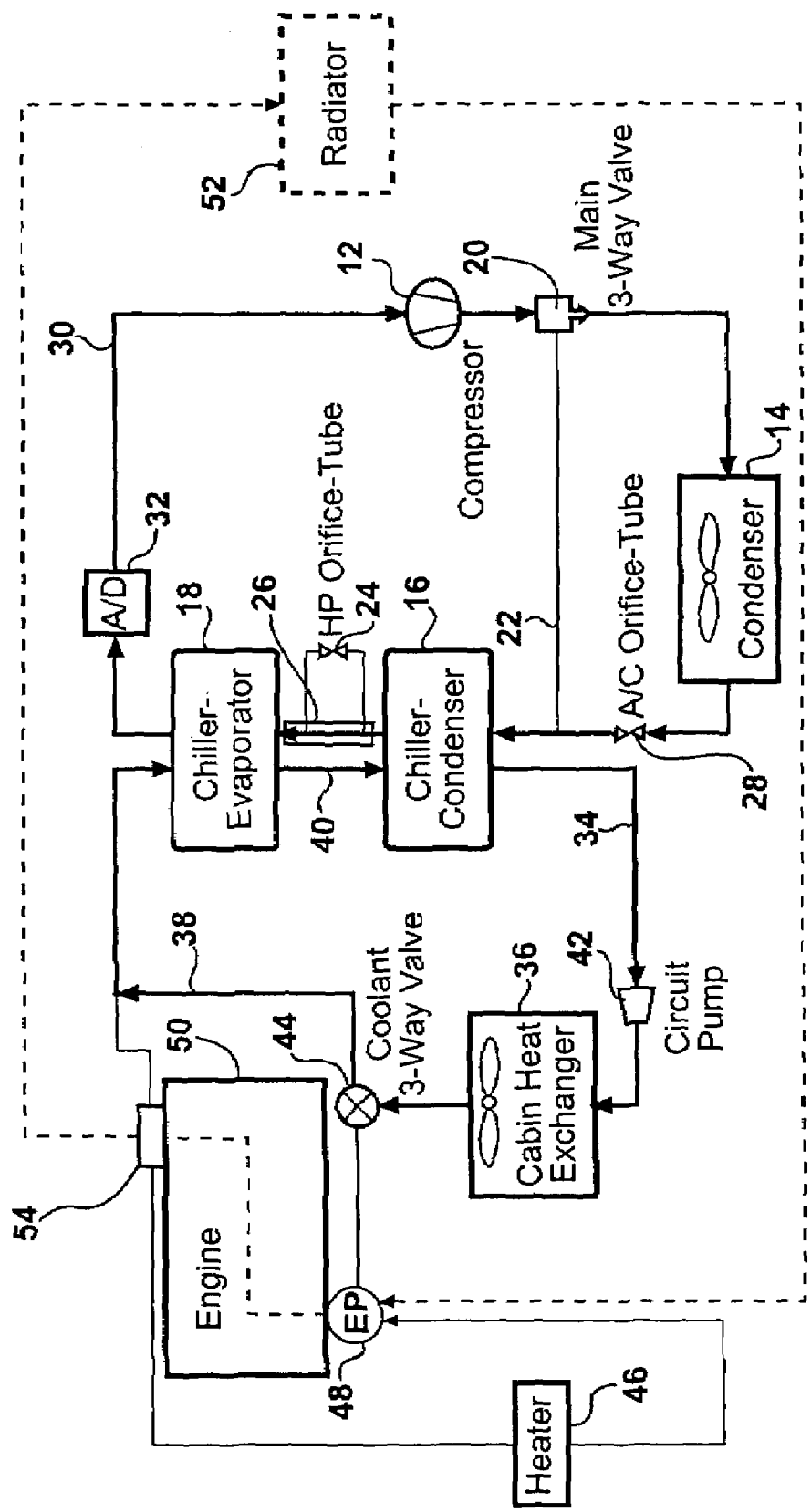
FIG. 1 is a schematic view illustrating the air-conditioning mode.
Figure 2:
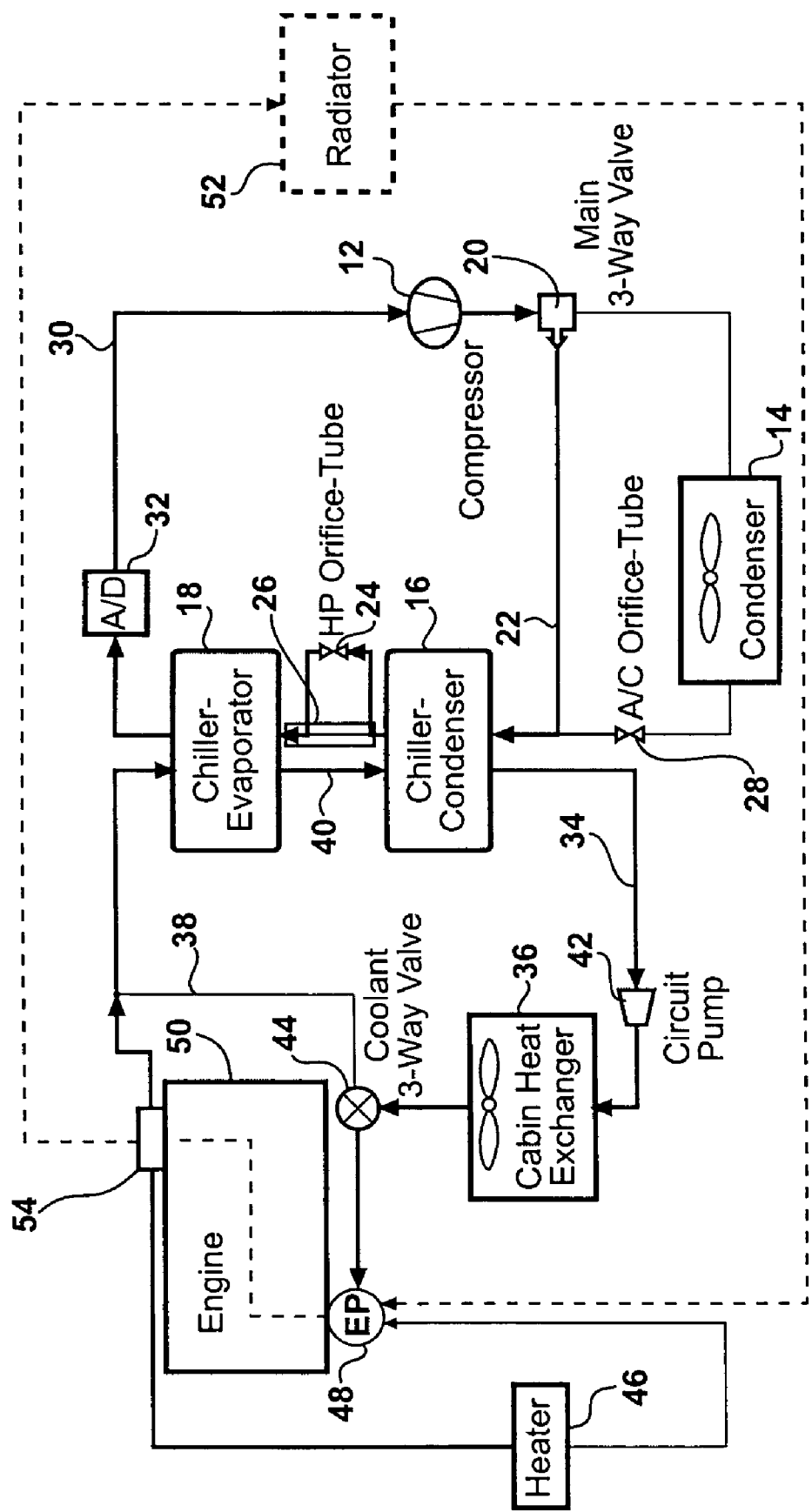
FIG. 2 is a schematic view illustrating the heat pump mode.

Referring to the drawings, a heater and air-conditioning assembly for a vehicle is shown schematically in FIGS. 1 and 2 wherein FIG. 1 illustrates the normal air-conditioning mode and FIG. 2 illustrates the heat pump mode.

As is customary, the system includes a compressor 12 for compressing a refrigerant and a front-end heat exchanger that acts as the traditional condenser 14 for condensing fluid from the compressor 12 in the air-conditioning mode.

A chiller-condenser 16 is disposed downstream of the condenser 14 and a chiller-evaporator 18 is disposed downstream of the chiller-condenser 16. A main three-way valve 20 is disposed between the compressor 12 and the condenser 14 for directing flow from the compressor 12 to the condenser 14 in the air-conditioning mode and for directing flow from the compressor 12 through a by-pass line 22 to the chiller-condenser 16 in the heat pump mode.

A heat pump (HP) expansion device 24, taking the form of an orifice tube, is disposed between the chiller-condenser 16 and the chiller-evaporator 18 for expanding the refrigerant in the heat pump mode and a by-pass valve 26 is disposed between the chiller-condenser 16 and the chiller-evaporator 18 for directing flow from the chiller-condenser 16 through the heat pump expansion device 24 and to the chiller-evaporator 18 in the heat pump mode. For clarity the chiller-condenser 16 and chiller-evaporator 18 are shown separately in the figures, in reality they will be combined in one integral unit containing by-pass valve 26, expansion device 24 and interconnect 40 inserted between the appropriate tube passes.

An air-conditioning (A/C) expansion device 28, taking the form of an orifice tube, is disposed downstream of the condenser 14 and upstream of the by-pass line 22 for expanding the refrigerant adiabatically in the air-conditioning mode.

As is customary, a return line 30 extends from the chiller-evaporator 18 to the compressor 12 and an accumulator-dehydrator 32 is disposed in the return line 30.

A coolant feed line 34 conducts coolant flow from the chiller-condenser 16 to a cabin heat exchanger 36 while a coolant exit line 38 conducts coolant from the cabin heat exchanger 36 to the chiller-evaporator 18. An interconnect line 40 conducts coolant from the chiller-evaporator 18 to the chiller-condenser 16. Line 40 shown in the figures for clarity. In actual practice line 40 will be internally incorporated in the coolant circuit (or pass) going from the chiller-evaporator 18 to the chiller condenser 16. A circuit pump 42 is disposed in the feed line for pumping coolant from the chiller-condenser 16 to the cabin heat exchanger 36. A coolant three-way valve 44 is disposed in the exit line 38 for directing coolant from the cabin heat exchanger 36 to the engine coolant circuit in the heat pump mode. The customary heater 46 is disposed in the coolant circuit along with an engine pump (EP) 48 in the coolant circuit for pumping coolant through an engine 50 and the heater 46.

The system includes an engine radiator 52 and a thermostat 54 in the coolant circuit for selectively directing coolant in the coolant circuit through the heater 46, and/or the radiator 52 and/or the chiller-evaporator 18.

In the present invention, as shown in FIG. 2, the refrigerant flows through the main three-way valve 20 to bypass the traditional condenser 14 in the air-conditioning system. The refrigerant flows through a chiller-condenser 16 portion of a heat exchanger, which is generally or totally called the chiller in the air-conditioning mode (as shown in FIG. 1). Reverting back to FIG. 2, this chiller-condenser 16 portion of the heat exchanger acts as a condenser in the heat pump mode. In this heat exchanger, the refrigerant rejects heat to the coolant warming it up significantly. The coolant then flows through the cabin heat exchanger 36 warming up the air flowing across it into the passenger compartment. As shown in FIG. 2, there is a bypass valve 26 within the chiller heat exchanger allowing the refrigerant to flow through the HP orifice tube 24 in the heat pump mode. In the air-conditioning mode the HP orifice tube 24 is bypassed as shown in FIG. 1. This geometry allows the use of two expansion devices 24 and 28 shown as orifice tubes in the system; 24 operational in the heat pump mode and 28 operational in the air-conditioning mode. This is a significant advantage because this allows optimization of size for the two modes independently and inexpensively.

Again, reverting back to FIG. 2, after the refrigerant flows through the HP orifice tube 24 it goes into the chiller-evaporator 18 that takes heat away from the coolant in allowing the refrigerant to evaporate. This, of course, cools down the coolant but the net gain in heat is insignificant because of the pumping action of the compressor. Thus, the condenser 14 is not utilized in the heat pump mode. Again, this eliminates the freezing of the moisture on the "evaporator" in the heating mode.

Regarding the coolant circuit, the coolant three-way valve 44 directs the coolant through the engine 50 and prevents coolant from bypassing the engine 50. The coolant flows through the traditional heater core 46 and/or the cabin heat exchanger 36 and/or through the radiator 52, or all three circuits. The flow path is determined by the thermostat 54, which is controlled electronically. This allows the flow through the heater core 46 to be cut off completely when the air-conditioning is on helping in air-conditioning discharge temperatures because of the absence of heat in the HVAC module (generally the flow of hot coolant in the heater core 46 raises a/c discharge temperatures by 1–to 2° F.). Of course, in winter, when heat is required in the passenger compartment, cold coolant is initially routed only through the cabin heat exchanger 36 circuit. This is because the cold coolant does not help in warm-up by passing it through the heater core 46. When a sufficiently high temperature is reached, the coolant is also partially circuited into the heater core 46 and subsequently to the radiator 52. When the coolant is warm enough to be cooled in the radiator 52, the heat pump is turned off.

Also, the cabin heat exchanger circuit has an electrically driven pump. This pump is sized to allow pumping of a more viscous coolant in air-conditioning mode. The coolant is fairly cold during this operation because it is cooled down to 20–30° F. to allow for good air-conditioning performance that makes the coolant viscous.

As illustrated in FIG. 1, switching the 3-way valve 20 into the correct or normal A/C position now uses the main condenser circuit. This circuit also includes the A/C orifice tube 28 that is used for air-conditioning. As mentioned earlier, this A/C orifice tube 28 is sized correctly for air-conditioning mode. The HP orifice tube 24 within the two chiller portions is bypassed in the A/C mode resulting in one big chiller 16, 18. This is a very big advantage because the chiller is sized for air-conditioning performance and results in too big of a heat exchanger for the heat pump mode. Thus, the two split heat exchangers or chillers 16 and 18 in heat pump mode are more optimally sized for heat pump performance.

In the air-conditioning the coolant is restricted to the cabin heat exchanger 36 circuit. The three-way valve 44 located ahead of the engine water pump 48 directs coolant into the coolant line 38 cutting off flow to the engine 50. Also, the thermostat 54 at the engine shuts off flow to the cabin heat exchanger circuit; a bleed into this circuit from the engine would be detrimental to A/C performance.

During times of a real need to cool down the engine 50 beyond the capability of the radiator 52, e.g., in a hill climb, the coolant could be routed through the engine 50 to cool it down. Of course, this would result in a loss of air-conditioning in the passenger compartment during this time but this would result in additional engine cooling in an emergency.

In another embodiment, the heater core 46 may be eliminated. As can be noted in FIG. 2, the coolant would then be pumped through the engine 50, by the engine pump 48, then through the chiller-evaporator 18 and chiller-condenser 16, then through the cabin heat exchanger 36 and the coolant 3-way valve 44 and then back through the engine. This saves the cost of another heat exchanger. When the coolant temperature reaches a sufficiently high temperature the heat pump can be turned off. Incidentally, the electric pump can be turned off for most heat pump applications and is necessary mainly for air-conditioning operation.

Obviously, many modifications and variations of the present invention are possible in light of the above teachings. The invention may be practiced otherwise than as specifically described within the scope of the appended claims.

What is claimed is:

1. A heater and air-conditioning assembly for a vehicle comprising;

a compressor (12) for compressing a refrigerant, a front end condenser (14) in fluid communication with said compressor for condensing fluid from said compressor (12), a chiller-condenser (16) disposed downstream of and in fluid communication with said condenser (14), a chiller-evaporator (18) disposed downstream of and in fluid communication with said chiller-condenser (16), a main three-way valve (20) disposed between said compressor (12) and said condenser (14) for directing flow from said compressor (12) to said condenser (14) in an air-conditioning mode and for directing flow from said compressor (12) through a by-pass line (22) to said chiller-condenser (16) in a heat pump mode, a heat pump expansion device (24) for expanding and exchanging heat with the refrigerant in said heat pump mode, and an by-pass valve (26) disposed between said chiller-condenser (16) and said chiller-evaporator (18) for directing flow from said chiller-condenser (16) through said heat pump expansion device (24) and to said chiller-evaporator (18) in said heat pump mode, a cabin heat exchanger (36), a coolant feed line (34) for conducting coolant flow from said chiller-condenser (16) to said cabin heat exchanger (36), a coolant exit line (38) for conducting coolant from said cabin heat exchanger (36) to said chiller-evaporator (18), an interconnect line (40) for conducting coolant from said chiller-evaporator (18) to said chiller-condenser (16), and a coolant three-way valve (44) in said exit line (38) for directing coolant from said cabin heat exchanger (36) to an engine coolant circuit in said heat pump mode.

2. A heater and air-conditioning assembly for a vehicle comprising;

a compressor (12) for compressing a refrigerant, a front end condenser (14) in fluid communication with said compressor for condensing fluid from said compressor (12), a chiller-condenser (16) disposed downstream of and in fluid communication with said condenser (14), a chiller-evaporator (18) disposed downstream of and in fluid communication with said chiller-condenser (16), a main three-way valve (20) disposed between said compressor (12) and said condenser (14) for directing flow from said compressor (12) to said condenser (14) in an air-conditioning mode and for directing flow from said compressor (12) through a by-pass line (22) to said chiller-condenser (16) in a heat pump mode, a heat pump expansion device (24) for expanding and exchanging heat with the refrigerant in said heat pump mode, and an by-pass valve (26) disposed between said chiller-condenser (16) and said chiller-evaporator (18) for directing flow from said chiller-condenser (16) through said heat pump expansion device (24) and to said chiller-evaporator (18) in said heat pump mode, a cabin heat exchanger (36), a coolant feed line (34) for conducting coolant flow from said chiller-condenser (16) to said cabin heat exchanger (36), a coolant exit line (38) for conducting coolant from said cabin heat exchanger (36) to said chiller-evaporator (18), an interconnect line (40) for conducting coolant from said chiller-evaporator (18) to said chiller-condenser (16), and a coolant three-way valve (44) in said exit line (38) for directing coolant from said cabin heat exchanger (36) to said chiller-evaporator (18) and chiller-condenser (16) in said air conditioning mode.

3. An assembly as set forth in claim 2 including a heater (46) in said coolant circuit, an engine pump (48) in said coolant circuit for pumping coolant through an engine (50) and said heater (46).

4. An assembly as set forth in claim 3 including a radiator (52), a thermostat (54) in said coolant circuit for selectively directing coolant in said coolant circuit through said heater (46) and said radiator (52) and said chiller-evaporator (18).

5. An assembly as set forth in claim 4 including an air-conditioning expansion device (28) disposed downstream of said condenser (14) and upstream of said by-pass line (22) for expanding the refrigerant in the air-conditioning mode, a return line (30) from said chiller-evaporator (18) to said compressor (12), an accumulator-dehydrator (32) in said return line (30), and a circuit pump (42) in said feed line for pumping coolant from said chiller-condenser (16) to said cabin heat exchanger (36).

* * * * *